(12) United States Patent
Hong et al.

(10) Patent No.: US 7,244,110 B2
(45) Date of Patent: Jul. 17, 2007

(54) FAN HUB ASSEMBLY FOR EFFECTIVE MOTOR COOLING

(75) Inventors: Tao Hong, Farmington Hills, MI (US); John R. Savage, Rochester Hills, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 638 days.

(21) Appl. No.: 10/675,342

(22) Filed: Sep. 30, 2003

(65) Prior Publication Data

US 2005/0067500 A1    Mar. 31, 2005

(51) Int. Cl.
*F04B 17/03* (2006.01)
*H02K 9/06* (2006.01)

(52) U.S. Cl. .......................... 417/368; 310/62
(58) Field of Classification Search ................... 310/62; 417/366, 368, 371
See application file for complete search history.

(56) References Cited

U.S. PATENT DOCUMENTS

| 3,303,995 | A | * | 2/1967 | Boeckel ...................... 417/368 |
| 4,210,833 | A | * | 7/1980 | Neveux ....................... 417/368 |
| 4,836,148 | A | | 6/1989 | Savage et al. |
| 5,236,306 | A | * | 8/1993 | Hozak .......................... 310/62 |
| 5,577,888 | A | | 11/1996 | Capdevila et al. |
| 5,944,497 | A | * | 8/1999 | Kershaw et al. ............. 417/368 |
| 5,967,764 | A | * | 10/1999 | Booth et al. ................ 417/368 |
| 6,283,726 | B1 | * | 9/2001 | Fackelmann et al. ....... 417/368 |
| 6,682,320 | B2 | * | 1/2004 | Gold et al. .................. 417/368 |
| 7,042,121 | B2 | * | 5/2006 | De Filippis et al. .......... 310/62 |
| 2004/0223845 | A1 | * | 11/2004 | Caplan et al. ............. 415/173.1 |

FOREIGN PATENT DOCUMENTS

DE          4441649 A1  *  5/1996

* cited by examiner

*Primary Examiner*—Michael Koczo, Jr.
(74) *Attorney, Agent, or Firm*—Jacox, Meckstroth & Jenkins

(57) ABSTRACT

An electrically powered axial-flow fan has a hub to house the motor and support the fan blades. Small blades or vanes on the inside of the hub function as a radial-flow blower to draw cooling air through cooling ports on the electric motor housing. The vanes inside the hub cooperate with a flange surrounding the motor to form a low pressure chamber under the hub to improve cooling flow through the motor. This motor cooling air flow is then ejected into the exhaust stream of the axial-flow fan.

12 Claims, 3 Drawing Sheets

FAN HUB ASSEMBLY FOR EFFECTIVE MOTOR COOLING

The invention concerns a specially designed fan hub and a flange around the motor which combine to provide cooling air flow for an electric motor which drives the fan.

BACKGROUND OF THE INVENTION

An engine cooling fan and electric motor assembly is used to provide radiator and A/C condenser cooling airflow in engine compartments of many vehicles. The engine compartment itself is a high-temperature environment. To complicate matters, the motor generates its own internal heat during the normal course of operation. The internally generated heat is primarily due to Joule heating caused by electric current passing through its rotor and stator coils, and brush losses. High temperatures can greatly increase the wear of motor brushes and bearings, and significantly reduce motor life.

One solution to these problems is to provide cooling holes 44a, 44b in FIG. 4, to admit cooling air through the motor 22. The invention provides additional strategies to cool motor 22.

SUMMARY OF THE INVENTION

The object of the invention is to provide an improved cooling system for electric motors which drive a fan.

In one aspect of the invention, a fan with a specially designed hub is provided, which is powered by an electric motor. By this design, the inside of the hub becomes a radial-flow blower. The radial-flow blower draws cooling air through the electric motor, and exhausts the spent cooling air into the exhaust stream of the engine cooling fan.

In one aspect, this invention comprises a cooling system for use in a vehicle, comprising an electric motor comprising a housing and an airflow path through the motor for cooling the motor, a fan comprising a hub having a connector for mounting to a shaft of the electric motor, a plurality of fan blades extending radially from the hub, a plurality of ribs situated between the connector and the hub; and the plurality of ribs cooperating with the housing to define a pathway for channeling air from the motor cooling airflow path into the exit stream of the main flow stream created by the plurality of fan blades.

In yet another aspect this invention comprises a method for cooling an electric motor, the method comprising the steps of providing an electric motor having an airflow passageway, and situating a fan comprising a hub for mounting on a shaft of the electric motor, the hub cooperating with a cover on the electric motor to form a low pressure area that draws cooling airflow through the airflow passageway inside the motor.

In yet another aspect this invention comprises an electric fan for use on a vehicle comprising: an electric motor having an airflow passageway, and a fan assembly mounted on a shaft of the electric motor, the fan assembly comprising: a hub on which a plurality of fan blades are situated for creating an axial air flow, and the hub further comprising a plurality of ribs at least partially surrounding a cover of the electric motor for creating a radial air flow used for cooling the motor and then directed toward the axial air flow.

These and other objects and advantages of the invention will be apparent from the following description, the accompanying drawings and the appended claims.

BRIEF DESCRIPTION OF THE DRAWINGS

FIG. 4 is a perspective fragmentary view of the hub and motor assembly with several blades removed for ease of illustration.

DETAILED DESCRIPTION OF THE INVENTION

Figure 1:
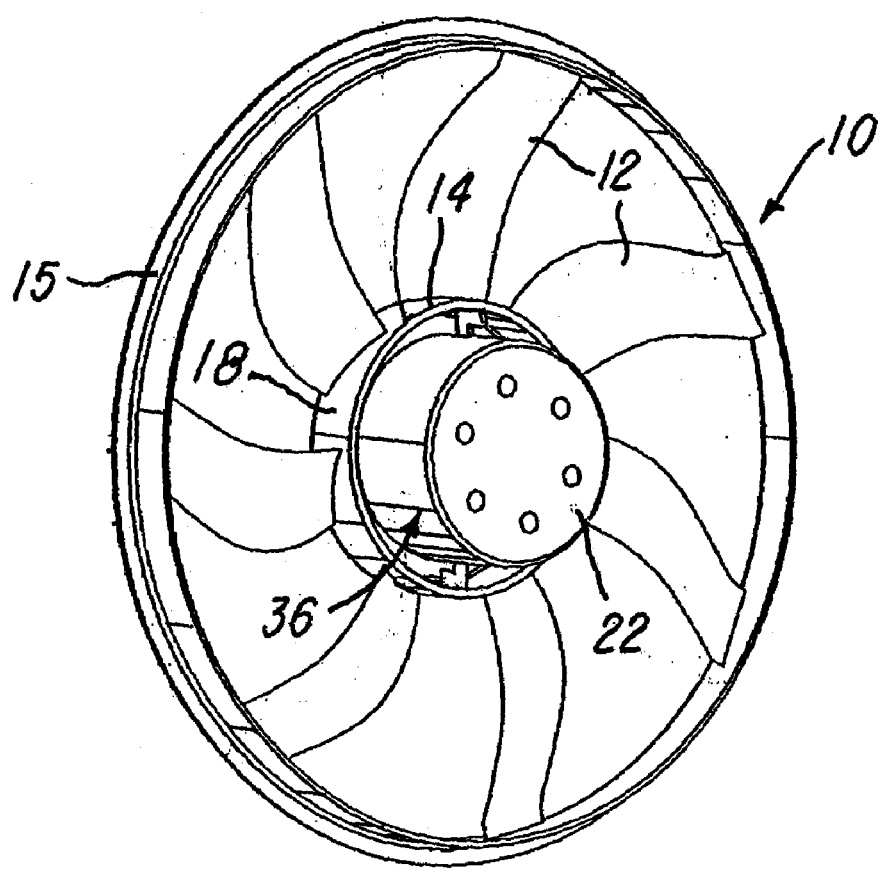
FIG. 1 is view of a hub in accordance with one embodiment of the invention.
Figure 2:
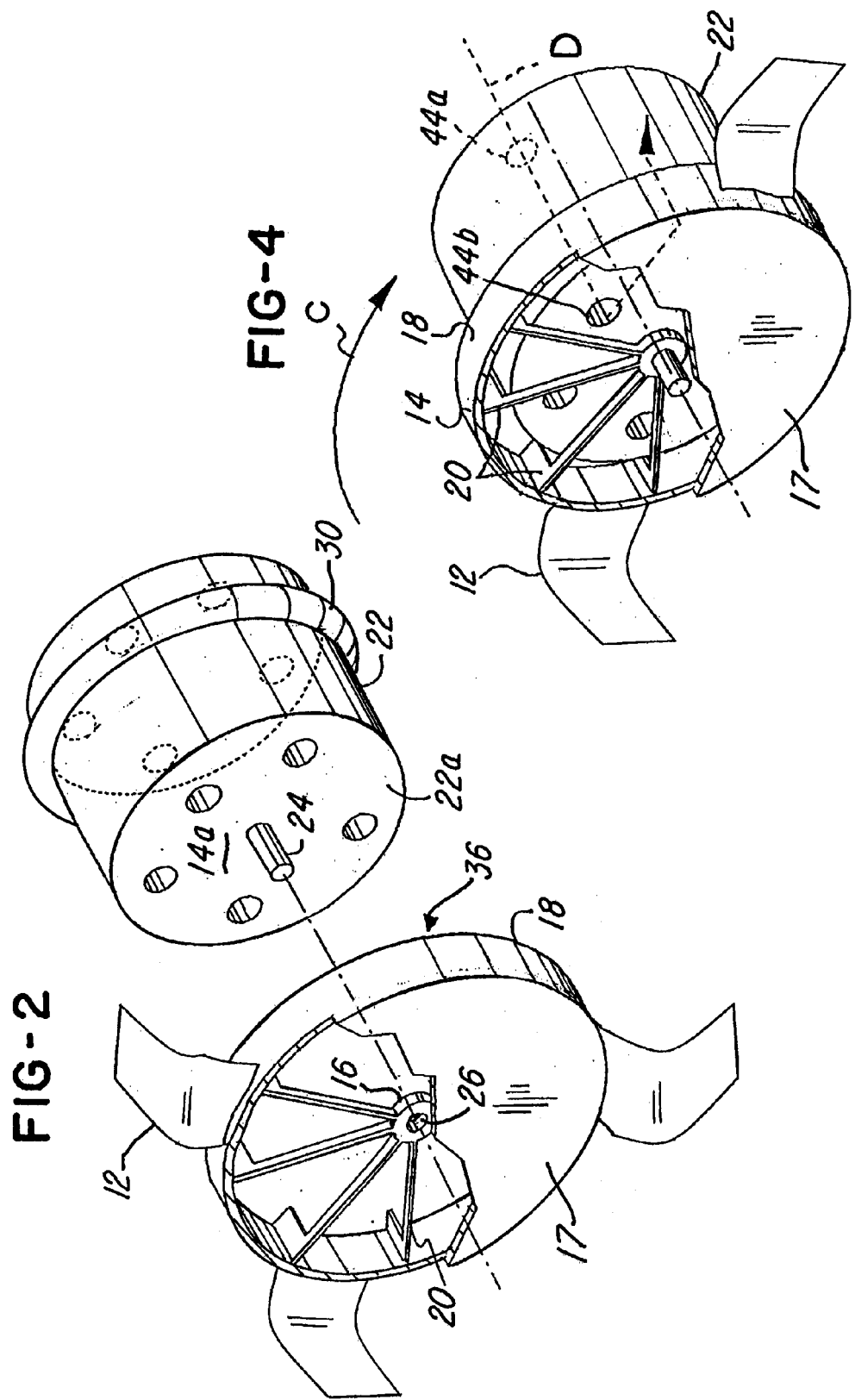
FIG. 2 is an exploded view showing the hub and motor.

FIG. 1 illustrates a fan assembly or fan 10 in accordance with one embodiment of the invention. The fan 10 comprises a plurality of fan blades 12 that extend radially between a hub 14 and a ring shroud 15. The hub 14 comprises a circumferential ring 18 to which the fan blades 12 are integrally formed and a front wall 17 (FIG. 2). A plurality of radial ribs 20 rise from the front wall 17 and extend between the connector 16 and circumferential ring 18, as illustrated in FIG. 2. It should be understood that the fan 10 may be a one-piece construction molded from plastic or other suitable material.

FIG. 2 illustrates an exploded fragmentary view illustrating an electric motor 22 for rotatably driving fan 10. The electric motor 22 comprises a shaft 24 which is received in the aperture 26 defined by connector 16 and secured thereto by conventional means, such as a nut or spring clip attachment design. Air holes 44a and 44b (FIG. 4) permit air to flow through the motor 22 as is conventionally known.

Figure 3:
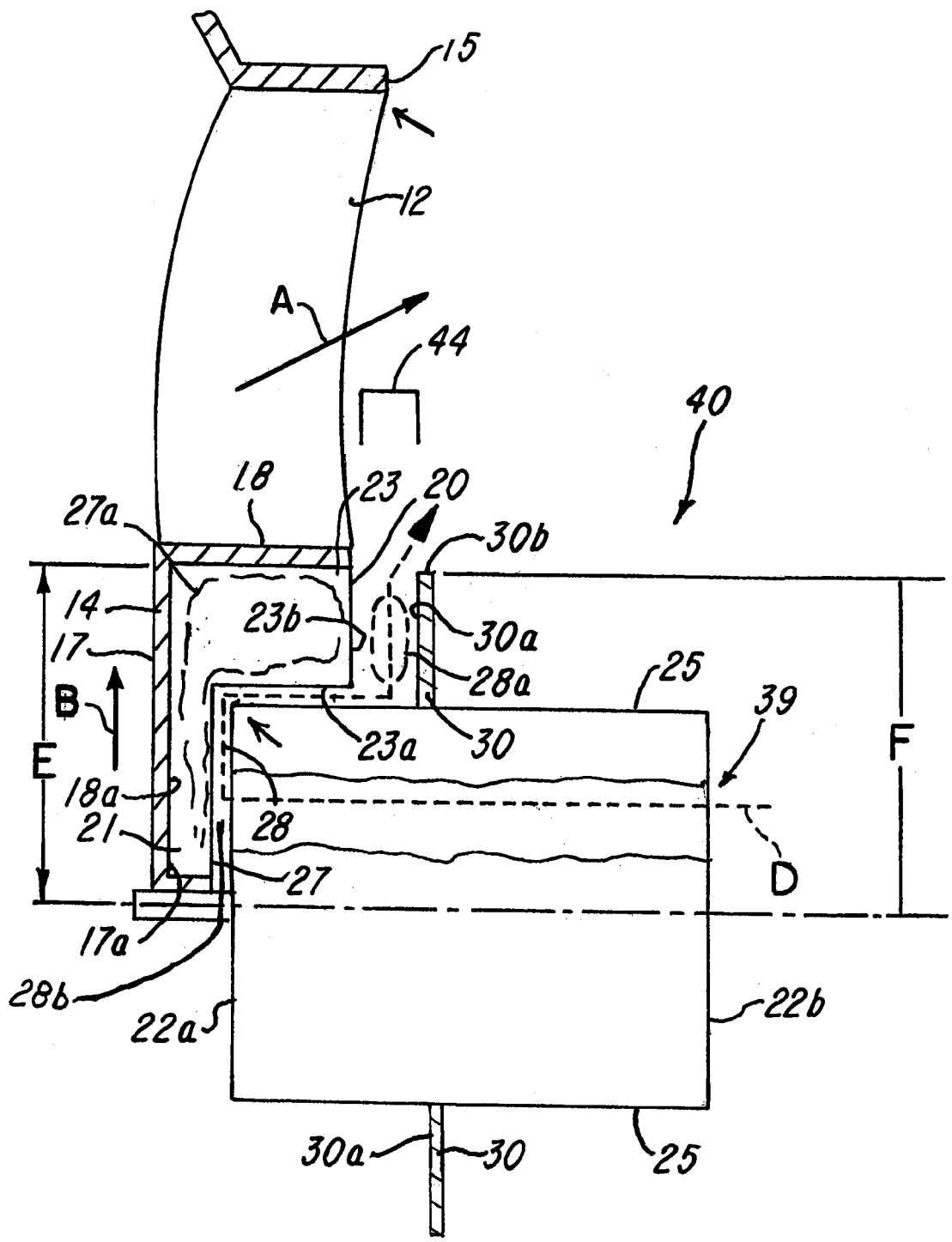
FIG. 3 is a fragmentary view of the hub and motor assembly.

For ease of description, one of the ribs 20 will be described, but it should be understood that each of the ribs 20 are similarly constructed. Note that each rib 20 is generally L-shaped, as shown in FIG. 3, and comprises a portion 21 having a first surface or edge 27 and second portion 23 having surface or edges 23a and 23b. The edge or surface 27 and the inner surface of the hub wall 17a (FIGS. 2 and 3) cooperates with a front face 22a of motor 22 to define a low-pressure area or chamber 27a (FIG. 3). The axial gap between surfaces 17a and 22a and between adjacent ribs 20 is the low pressure chamber and the motor cooling airflow pathway.

Note that the motor 22 comprises a housing or casing 25 having a circumferential flange or bulkhead 30 (FIGS. 2 and 3) that extends radially outward from the casing 25 of motor 22. Note that the flange 30 comprises a surface 30a that is situated in proximate relation to edge 27 of rib 20, as illustrated in FIG. 3. Thus, as best illustrated in FIG. 3, notice that the edges 27, 23a and 23b of each rib 20 and the surface 17a cooperate with the surfaces 22a, 25 and 30a, respectively, to define a low pressure channel or area 27a through which air may flow. Ideally, it is desired to have a distance or gap 28a be small or minimized to facilitate creating a low-pressure chamber between the hub 14 and the motor 22 and flange 30. It is desirable to have the axial gap 28a between surface 23b and 30a to be optimized and dimensioned along with the respective diameter of the inside of the hub wall 18 and outside diameter of the flange. There is also an optimum relationship between the constraints defining the region 28a as shown in FIG. 3 that maximizes the low pressure level of the said low pressure channel or area. The defining constraints of the region 28a are the rear edge of the rib 20 defined as 23b, the forward surface of the flange 30, indicated by 30a, the inner diameter of the hub wall 18, defined by 18a and expressed as double arrow E, and the outer edge of the flange 30, defined by 30*b* and also expressed as the double arrow F. The relationship between the axial gap and the respective diameters of the inner hub wall and the outer diameter of the flange must be jointly optimized to maximize the cooling flow drawn through the motor.

As best illustrated in FIGS. 1 and 2, the generally L-shaped ribs 20 and wall 18 make up or define an area 36 for receiving the electric motor 22 such that the ribs, or at least portions 23 of ribs 20 surround the housing 25 (FIG. 3). In embodiment being described, the clearance between the surfaces 27, 23*a* and 23*b* and the surface 22*a*, 25 and 30*a* should be minimized as much as possible. It has been found that a channel 27*a* having a relatively small clearance 28*b* will increase a rotational speed (i.e., in the direction of arrow B in FIG. 3) of air confined within the area or chamber 36, which further reduces the pressure in area 27*a* relative to the area outside of area 36.

Thus, it should be appreciated that the invention provides a cooling system for use in a vehicle. Note that the plurality of fan blades 12 direct air flow in the direction of arrow A in FIG. 3 which indicates a mixed axial and radial exit airflow character. The plurality of ribs 20 direct air flow in a radial direction indicated in arrow B in FIG. 3. Note that the channel 27*a* directs the air flow generally radially across the face 22*a* of motor 22, then axially along the housing 25 of motor 22 and then again radially along surface 30*a* toward the air flow A. Thus, one feature of the invention is that the ribs 20 ultimately direct air flow toward the plurality of blades 12 which direct air flow in a mixed axial and radial character per direction arrow A. The motor cooling exit flow is assisted or entrained by the presence of the higher velocity airflow generated by the plurality of blades 12. This entrainment by the higher velocity main cooling fan airflow that occurs in the general area 40 increases cooling airflow through the motor, which further improves cooling of the electric motor 22.

Advantageously, this invention provides an electric motor having an air flow passageway and further comprising a fan assembly having a hub that cooperates with the motor housing to form a low pressure area referred to above and that communicates with the air flow passageway to facilitate improving air flow through the electric motor.

Another advantage of the invention is that it provides an electric fan for use on a vehicle which is designed to generate cooling airflow through the motor 22 that moves radially across the front face 22*a* of motor 22 and toward the area 40 (FIG. 3) where the air flowing through channel 27*a* is directed toward area 40 where it meets and is entrained by the air flow generated by fan blades 12, as indicated by arrow A in FIG. 3.

Notice also that the invention provides an electric fan having a hub 14 that extends or partially surrounds the housing 25, as illustrated in FIG. 3. Notice also that the fan blades or a portion of the fan blades 12 may also extend over the motor 22 in generally opposed relationship to the motor housing 25 as shown. Thus, the ribs 20 are formed to surround at least a portion of the motor housing surface 25 to further facilitate creating the low pressure area and the channel 27*a* for providing a controlled air flow across surfaces 22*a*, 25 and 30*a*.

The motor 22 comprises the holes or openings 44*a* and 44*b* that permit air to flow through motor 22. Notice that the invention facilitates causing air to flow in the direction of dashed arrow D in FIGS. 3 and 4. In operation, the hub 14 rotates as indicated by arrow C in FIG. 4. Each portion 21 and portion 23 sweeps air across the surfaces 22*a* and 25 (FIG. 3). Centrifugal force pushes the swept air radially through channel 27*a* and generally radially outward in the direction of dashed arrow D in FIG. 3. As the air exits channel 27*a*, it is further urged toward the fan blades 12 which forces the air in the direction of arrow A. Further, the pressure at area 40 (FIG. 3) is greater than the pressure in channel 27*a*. The flange 30 helps reduce flow recirculation across area 44 and maintains the low pressure in the channel 27*a* between the hub 14 and motor 22.

The low pressure in area or channel 27*a* causes air to pass through holes 44*a*, 44*b* (FIG. 4) in the motor housing 25. While within the motor 22, the air passes along the rotor (not shown), cooling the rotor, the associated stator (not shown) and other internal components of the motor 22. This air is then expelled from the displacement and injected toward the area 40 in the direction of dashed arrow D (FIG. 3).

The shape and number of ribs 20 within the hub 14 and the clearance between the ribs 20 and motor housing 25 and flange 30 must be selected to ensure air in the area 28*b* closely follows the rotation of the hub 14. The number of vanes 20 must also not be so high as to severely block motor cooling air-flow passage. Increased rotational speed of the fan 10 will increase the air flow in the direction of arrow D (FIG. 4) and should resultingly increase cooling flow through motor 22. An increase in an overall diameter of the hub 14 will also work to lower the pressure in the area 36 and therefore, increase motor cooling flow.

Advantageously, this system and method provides a hub having a plurality ribs 20 that cooperate with a motor housing 25 to define the coupling channel 36. The coupling channel 36 defines a low-pressure area around the motor housing 25 which facilitates urging air through the motor casing 25 which, in turn, facilitates cooling of the motor 22.

While the system and method described, constitute preferred embodiments of this invention, it is to be understood that the invention is not limited to this precise system and method, and that changes may be made in either without departing from the scope of the inventions, which is defined in the appended claims.

What is claimed is:

1. A cooling system for use in a vehicle, comprising:
   an electric motor comprising a housing and an airflow path through the motor for cooling the motor, said housing comprising a front wall and a generally cylindrical side wall;
   a fan comprising a hub having a connector for mounting to a shaft of said electric motor, said hub having a planar portion and a generally cylindrical portion, said planar portion lying in a radial plane that is generally parallel to a plane in which said front wall of said housing lies and said generally cylindrical portion lying in a cylindrical plane, comprising at least a portion of said cylindrical portion extending over said generally cylindrical side wall of said housing;
   a plurality of fan blades extending radially from said hub;
   a plurality of ribs situated between said connector and said hub;
   a circumferential flange that extends radially outward from said generally cylindrical side wall; and
   said planar portion being axially spaced from said front wall by a first dimension and said generally cylindrical portion being spaced from said cylindrical side wall by a second dimension in order to define an airflow path comprising a first pressure area and a second pressure area that is in fluid communication with said first pressure area, said first dimension being smaller than said second dimension;

said circumferential flange positioned on said generally cylindrical side wall in opposed relation to said planar portion of said hub and downstream of an edge of said generally cylindrical portion of said hub, said circumferential flange further being adapted and dimensioned to facilitate cooling flow drawn through the electrical motor and the airflow passageway.

2. The cooling system as recited in claim 1 wherein at least a portion of at least one of said plurality of ribs is situated in operative relationship with said generally cylindrical side wall.

3. The cooling system as recited in claim 1 wherein at least one of said plurality of ribs is generally L-shaped.

4. The cooling system as recited in claim 2 wherein at least one of said plurality of ribs is generally L-shaped.

5. The cooling system as recited in claim 1 wherein at least one of said plurality of ribs comprises a portion that is situated in opposed relation to said front wall of said electric motor and a second portion situated in opposed relation to said generally cylindrical side wall of said electric motor in order to provide a channel for channeling air from said airflow path into a second airflow path.

6. The cooling system as recited in claim 5 wherein said channel defines a first pressure area and an area outside said channel defines a second pressure area, pressure in said first pressure area being lower than pressure in said second pressure area.

7. The cooling system as recited in claim 5 wherein said channel defines a first pressure area and an area outside said channel defines a second pressure area, said first pressure area having a pressure that is lower than said second pressure area.

8. The cooling system as recited in claim 1 wherein said plurality of ribs are shaped to define a generally cylindrical area for receiving a front portion of said electric motor in order to create a channel to direct airflow from said airflow path into a second airflow path and toward an inlet of said airflow path, at least a portion of each of said plurality of ribs surrounding said housing.

9. A method for cooling an electric motor, said method comprising the steps of:
providing an electric motor having an airflow passageway, said electric motor comrprising a cover having a front wall and a generally cylindrical side wall;
providing a fan comprising a hub having a connector for mounting to a shaft of said electric motor, said hub having a planar portion and a generally cylindrical portion, said planar portion lying in a radial plane that is generally parallel to a plane in which said front wall lies and is spaced from said front wall by a first distance and a generally cylindrical portion that lies in a cylindrical plane, at least a portion of said generally cylindrical portion extending over a cylindrical side wall of said cover and being spaced therefrom by a second distance, said first distance being smaller than said second distance, said fan further comprising a plurality of fan blades extending radially from said hub and a plurality of ribs situated between said connector and said hub;
situating said fan on a shaft of said electric motor, said hub cooperating with said cover of said electric motor to form a low pressure area that communicates with said airflow passageway to facilitate airflow through said airflow passageway; and
providing a circumferential flange on said cover and downstream of said generally cylindrical portion of said hub, said circumferential flange extending radially outward from said cylindrical side wall of said cover and in generally opposed relationship to said planar portion of said hub and downstream of an edge of said generally cylindrical side wall of said hub to maximize a low pressure level in at least a portion of said airflow passageway to facilitate cooling flow drawn through the electrical motor.

10. The method as recited in claim 9 wherein said method further comprises the step of:
providing a hub having a plurality of ribs configured to cooperate with said cover on said electric motor to provide said low pressure area.

11. The method as recited in claim 10 wherein said plurality of ribs are each generally L-shaped and define a portion situated in opposed relation to said front wall of said cover and a portion situated in opposed relation to said generally cylindrical side wall of said cover.

12. The method as recited in claim 11 wherein said method further comprises the step of:
providing said plurality of L-shaped ribs to comprise a first leg portion opposed to said front wall of said electric motor and a second leg portion opposing said generally cylindrical portion of said hub, said first leg portion having an axial width that is less than a radial width of said second leg portion, and said second leg portion having different axial widths so that they are situated at least partially around the housing of the electric motor to define said low pressure area.

* * * * *